(12) United States Patent
Gibbs et al.

(10) Patent No.: US 7,568,631 B2
(45) Date of Patent: Aug. 4, 2009

(54) SYSTEM, APPARATUS AND METHOD FOR OBTAINING ONE-TIME CREDIT CARD NUMBERS USING A SMART CARD

(75) Inventors: Simon Gibbs, San Jose, CA (US); Rick Rafey, Santa Clara, CA (US); Jeffrey Dorn, Ridgewood, NJ (US); Keiji Shiotani, North Bergen, NJ (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 602 days.

(21) Appl. No.: 11/285,095

(22) Filed: Nov. 21, 2005

(65) Prior Publication Data

US 2007/0114274 A1   May 24, 2007

(51) Int. Cl.
*G06K 5/00* (2006.01)
(52) U.S. Cl. .................................... 235/494; 235/380
(58) Field of Classification Search ................. 235/380, 235/492, 494, 375, 382, 382.5
See application file for complete search history.

(56) References Cited

U.S. PATENT DOCUMENTS

| | | | | |
|---|---|---|---|---|
| 5,883,810 | A | * | 3/1999 | Franklin et al. ............. 700/232 |
| 5,957,695 | A | * | 9/1999 | Redford et al. ......... 434/307 R |
| 6,163,771 | A | * | 12/2000 | Walker et al. ................. 705/18 |
| 2001/0034721 | A1 | * | 10/2001 | Boudreau et al. ............. 705/72 |
| 2003/0212894 | A1 | | 11/2003 | Buck et al. |
| 2003/0222090 | A1 | | 12/2003 | Abdulhay et al. |
| 2004/0053642 | A1 | | 3/2004 | Sandberg et al. |
| 2004/0268122 | A1 | | 12/2004 | Satarasinghe |
| 2005/0182971 | A1 | | 8/2005 | Ong |

FOREIGN PATENT DOCUMENTS

WO   WO 0205165 A1 *  1/2002

* cited by examiner

*Primary Examiner*—Thien M Le
(74) *Attorney, Agent, or Firm*—John P. O'Banion

(57) ABSTRACT

A system, apparatus and method for utilizing one-time, or temporary, "credit" card information for executing purchase transactions with a smart card or similar electronic data card device. The card is activated in an activation process with the issuer prior to receiving and utilizing temporary card information (numbers). Retrieval and submission of temporary card information is performed in an automatic process executed by application programming, such as within a web browser. By way of example, a user surfing the web commences a purchase transaction wherein their smart card communicates with the issuer of the smart card to retrieve one-time or temporary use card data which is submitted through the network for processing within the transaction. In one embodiment the programming is executed within a web browser which marks card data fields within transaction forms and automatically fills these fields with temporary card information received from the issuer.

28 Claims, 6 Drawing Sheets

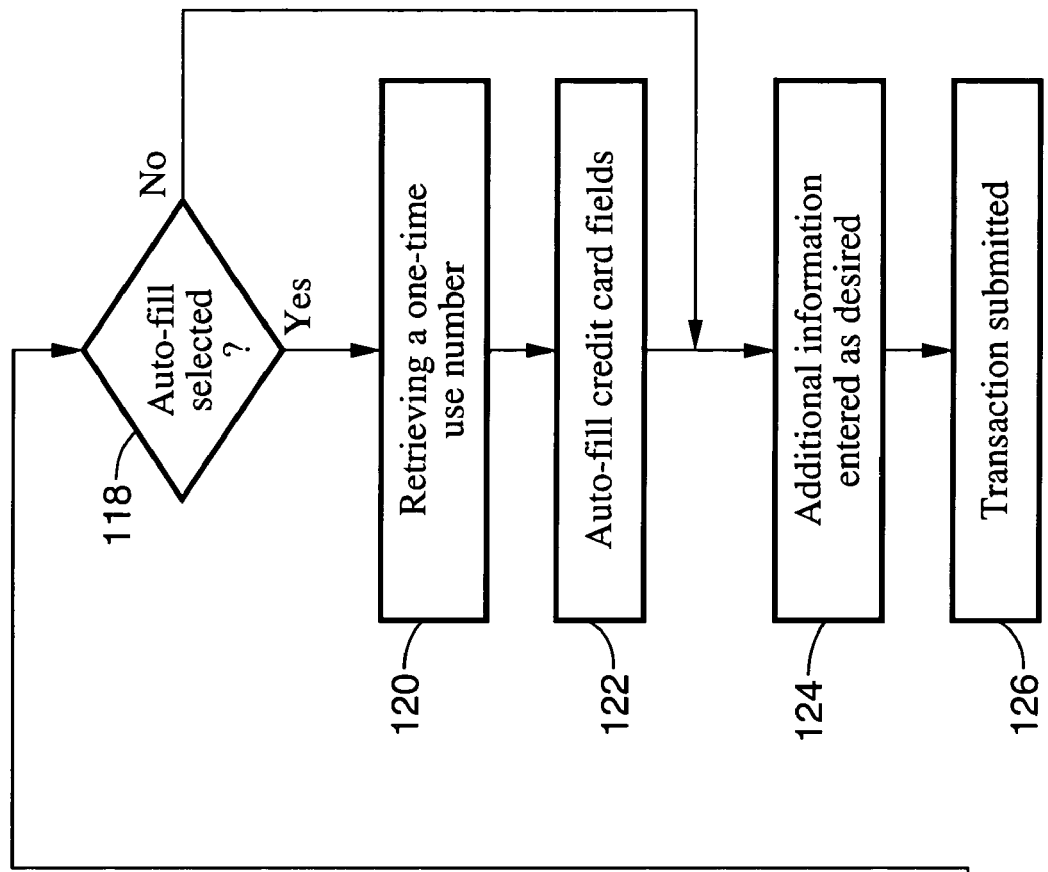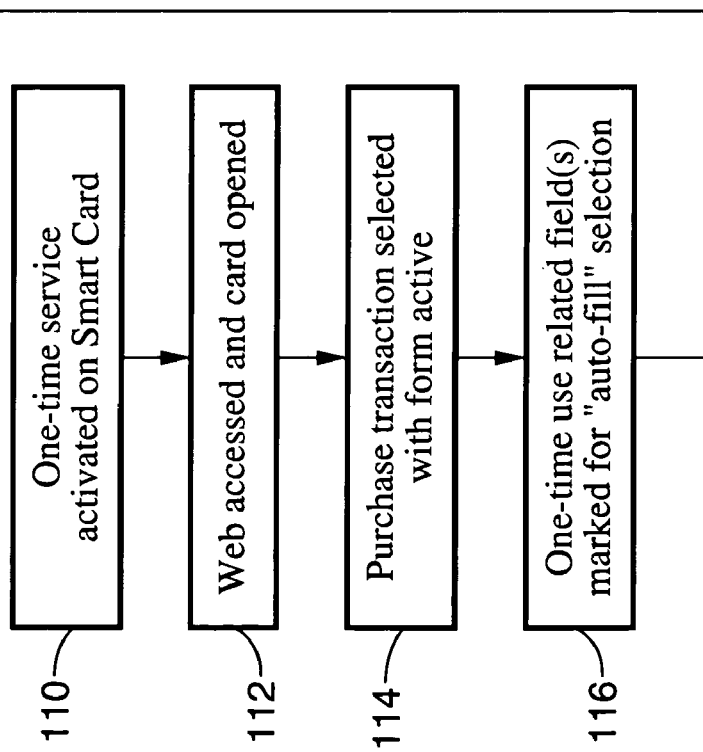
FIG. 6

SYSTEM, APPARATUS AND METHOD FOR OBTAINING ONE-TIME CREDIT CARD NUMBERS USING A SMART CARD

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND OF THE INVENTION

1. Field of Invention

The present invention pertains generally to smart cards, and more particularly to systems, devices and methods of utilizing smart cards in executing purchase transactions.

2. Description of Related Art

The credit card industry has been under increased pressures to adopt measures that will limit fraudulent card activity. The volume of card transactions which are fraudulent has increased significantly over the past few years, and new threats such as database and identity theft leave credit card accounts even more vulnerable. In view of the present transaction climate, it is not surprising that many credit card holders can be reluctant to engage in e-commerce activities because of concerns that their credit card numbers could be misused.

BRIEF SUMMARY OF INVENTION

The present invention provides a mechanism by which one-time use credit card numbers can be conveniently utilized in executing purchase transactions. A smart card system, apparatus and method are presented in which purchase transactions can be carried out utilizing temporary (e.g., one-time) credit card numbers which can be auto-filled into the transaction forms.

According to an aspect of the system, apparatus and method, the smart card stores credentials (e.g., issuer-account name-password triple) needed to automatically obtain the one-time numbers from the issuer and, in some cases, automatically executes or submits a transaction in response to obtaining the temporary credit card number. The credentials can, for example, be preloaded on the card (e.g., present prior to the transaction being initiated) whereas the one-time number would be obtained from the issuer at the time of the transaction.

In one embodiment, an apparatus comprises an electronic data card configured for being accessed by an electronic data card application program executable on a computer. The data card is further configured for receiving, via the electronic data card application program, a temporary card number from an issuing institution, or card issuer, of the electronic data card. The data card is also configured for automatically communicating the received temporary card number in response to submission of a purchase transaction through an electronic purchase transaction infrastructure.

In one embodiment, the data card is a functional component of a system comprising a computer, the electronic data card application program, and a card reader/writer connected to the computer and configured for reading and writing to the electronic data card. In one mode, the computer is configured with Internet connectivity for executing purchase transactions on web sites at the direction of a user of the computer browsing any world wide web portion. In another mode, the computer is configured to be coupled to the transaction infrastructure for submitting transactions from a merchant for execution by the card issuer.

In one embodiment, a method comprises providing the data card and/or system components described above.

Further aspects will be brought out in the following portions of the specification, wherein the detailed description is for the purpose of fully disclosing preferred embodiments without placing limitations thereon.

BRIEF DESCRIPTION OF THE SEVERAL VIEWS OF THE DRAWING(S)

FIG. 6 is a flowchart of a method by which smart cards can utilize "one-time" credit card numbers according to an embodiment herein.

DETAILED DESCRIPTION OF THE INVENTION

Figure 1:
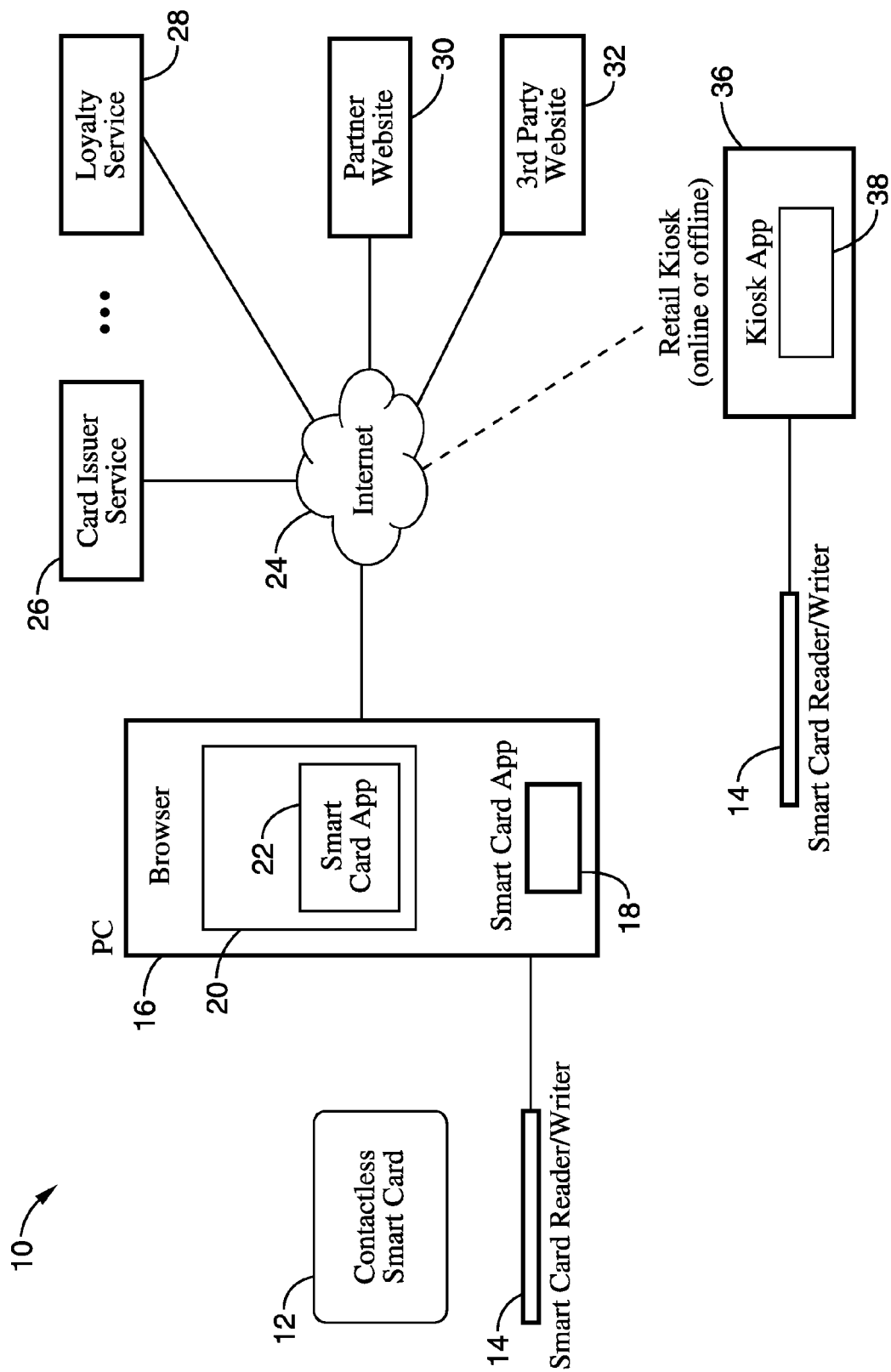
FIG. 1 is a block diagram of a system for utilizing one-time usable credit card numbers with a smart card according to an embodiment herein.

Referring more specifically to the drawings, for illustrative purposes the present invention is embodied in the systems, apparatus, and methods which will now be described in further detail, as well as their equivalents It will be appreciated that an apparatus or system may vary as to configuration and as to details of the parts, and that a method may vary as to the specific steps and sequence, without departing from the basic concepts as disclosed herein.

As an aid to understanding the discussion herein, several terms are defined below. However, it is to be appreciated that these definitions are provided for convenience and not as a substitute for other recitations within the specification and claims.

The term "smart card" is used herein to describe an electronic device containing memory, embodied in the form of a card device configured for facilitating the execution of financial transactions. By way of example, and not of limitation, the smart card contains information which can be used to identify the smart card to the credit card issuer and to retrieve a one-time credit card number. The system is configured, according to one embodiment, to fill out a transaction form utilizing a temporary or one-time number and account information which can be submitted under user (e.g., card holder) direction.

The terms "one-time credit card number", "one-time credit card information" and the like are used herein to convey the use of temporary card information generated for a single use, or less preferably, use over a specified number of transactions and/or time period. The information may comprise an account number and expiration date, such as those used within the current transaction infrastructure with credit cards having a sixteen (16) digit account number and a four (4) digit expiration date. In addition, other account and security information can be included, such as the three (3) digit security code as currently found on the reverse of a credit card. It should be appreciated that the number, format and structure of the information carried by a smart card may differ from those of current cards without departing from the teachings of the systems, apparatus and methods herein. The term "card number", therefore, will be considered herein to include the information carried by the smart card in whatever form it may take, whether conventional or specific to one or more smart card types.

The terms "smart card issuer", or "card issuer", are used herein to describe the organization that maintains a principle card database for a given card and upon which transactions are to be authorized. In one embodiment, the card issuer controls whether temporary card numbers can be issued, the card issuer issues (generates) temporary card numbers to authorized parties, and, during transaction execution, the card issuer determines the validity of generated temporary card numbers. Therefore, even if a smart card were to be obtained by a user as a generic electronic device, prior to use it would be registered and populated with account information, such as associated with Visa™, MasterCard™, American Express™ or the like which would represent the issuer. This term is defined in this manner since the party maintaining the principle database is in a preferred position for regulating the use of temporary numbers and correspondingly determining the validity of temporary numbers when transaction execution is attempted. The meaning of the term issuer is to include any parties or organizations that operate in conjunction with the actual issuing entity toward fulfilling the utilization of temporary card numbers.

The term "card reader/writer" is used to describe a device for accessing the information on an electronic data card (i.e., smart card or similar). It should be appreciated, however, that in applications which only require reading of the electronic data card, then only a "card reader" would be necessary, instead of a "card reader/writer" device.

In accordance with an aspect of the invention, an electronic data card and one-time use credit card processing system and method provides additional security to the card holder without substantially increasing the overhead involved in executing each transaction.

In one embodiment, the present system is configured for being utilized with various forms of electronic data cards. Although the description herein generally refers to the use of a smart card, it should be appreciated that other contact-bearing or contactless forms of electronic data cards can be utilized which have a different format or form factor, or in which the data card functionality is integrated within personal electronic devices such as cellular phones, PDAs, and the like.

It will be appreciated, therefore, that the electronic data card may actually be implemented as any form of electronic card or device configured with both memory and connectivity, and optionally adapted with security and transaction features. Executing transactions using the one-time use aspects of the invention can be integrated with a number of different devices.

By way of example, the electronic data card is any portable memory bearing device configured for establishing interconnectivity with a reader/writer device. The electronic data card can include any of the following types of devices, listed by way of example and not limitation: smart cards, digital wallets, cellular phones, personal digital assistants, FLASH drives, and so forth which are configured for storing information necessary to execute a purchase transaction.

The one-time use number, or information described herein is that associated with the financial transaction instrument. Most will readily recognize the card number, expiration and security codes associated with conventional credit card devices. The card number information is not generally considered to include information such as the user name and address which is normally required to accompany a transaction and does not change for any given user. By way of example, the minimum information typically necessary for executing a transaction comprises an account identification means and a security means. The user account identifier or smart card identifier can be secured by a security code, biometric security feature, or other security mechanism. The typical data passed can be the same as that of conventional magnetic stripe based cards and comprises the credit card account number and expiration dates, and in some cases includes a security code from the card (e.g., three digits). The identification and security data is retained within the memory circuits of the smart card and preferably also provides sufficient processing resources to facilitate communication and to maintain adequate security.

Additional information utilized by the present system can be stored online, on the personal device (e.g., PC), in the transaction processing system, or in the smart card itself, or a combination thereof.

The card reader, or more preferably reader/writer, can be integrated with or attached to a personal computer (e.g., station housing, keyboard, printer, accessory and so forth) or it may be integrated within a transaction processing system (e.g., self-serve kiosk, self-checkout register, conventional transaction processing equipment, and so forth).

An embodiment of a general process herein for automatically utilizing the one-time usable credit card numbers, or more accurately stated "card information", can be described as comprising the following steps:

(1) User registers and activates the smart card, wherein the smart card is prepared for the user and the one-time use feature is activated with the card issuer.

(2) User starts web browser, and "opens" the card by providing a password, or in response to other security means. The card is operably coupled for communication (e.g., wired or wirelessly) when it is opened.

(3) User navigates to purchase site, adds at least one item to the shopping cart (or mechanism providing similar purchase selection means), and commences a check-out process.

(4) A smart card application in the browser software detects a web form with a field for a card number and enters an "auto-fill" mode. In one aspect of this auto-fill mode the programming preferably accentuates this field on the web page in a desired manner, for example shading or highlighting the field. Other alternatives may be chosen to alert the user that the option exists. The application preferably also displays and activates an "auto-fill" button on the browser interface, such as in the toolbar. The above elements may be utilized either separately or more preferably in combination. For example, the field(s) can be accentuated and adapted to allow the user to click on the accentuated field to execute an auto-fill action, wherein a separate "auto-fill" selector (e.g., button) is not required. Similarly, the "auto-fill" interface selector (e.g., button) choice can be accentuated, such as by bright colors, flashing, and so forth to catch the user's attention to allow triggering the auto-fill activity, wherein accentuating the field or fields is not necessary.

(5) In response to the user selecting "auto-fill" the programming retrieves one-time use data for the transaction, for example credit card number and expiration date. In an alternative mode, the user need not make a selection of auto-fill but according to one embodiment the auto-fill can be performed automatically when the proper fields become available within a transaction screen.

In one mode, a communication is established at this time for retrieving the one-time use credit card information. For example the smart card application automatically logs in to "one time" number service of the card issuer, or similarly authorized party, and requests a one-time use number. By way of further example, the user can select a "one-time use" method of payment, such as from a drop down list in the web page.

In another mode, the one-time use number may have already been retrieved at a prior time in preparation for the transaction. For example, the number may be retrieved when the user logs on, or when the user opens a transaction window, or even during an earlier session. It is preferred that if one-time use data is to be pre-fetched, then an expiration condition (e.g., time period, session limit (during self-same session), number of times limit, and so forth) should be associated with the card number to enhance security. The one-time use data is passed through for executing the transaction, and a copy of the one-time value is preferably retained in the memory of the card to track the use of the credit card information for each purchase, so the user could assess what information was used when attempting to execute a selected transaction.

(6) Transaction information, including the one-time credit information, is submitted for executing the transaction. It will be appreciated that after auto-fill is performed the user can fill in any remaining fields prior to submitting the transaction for execution. Alternatively, the transactions submission can be alternatively performed in segments, or otherwise separated, without departing from the teachings of the present invention.

Figure 2:
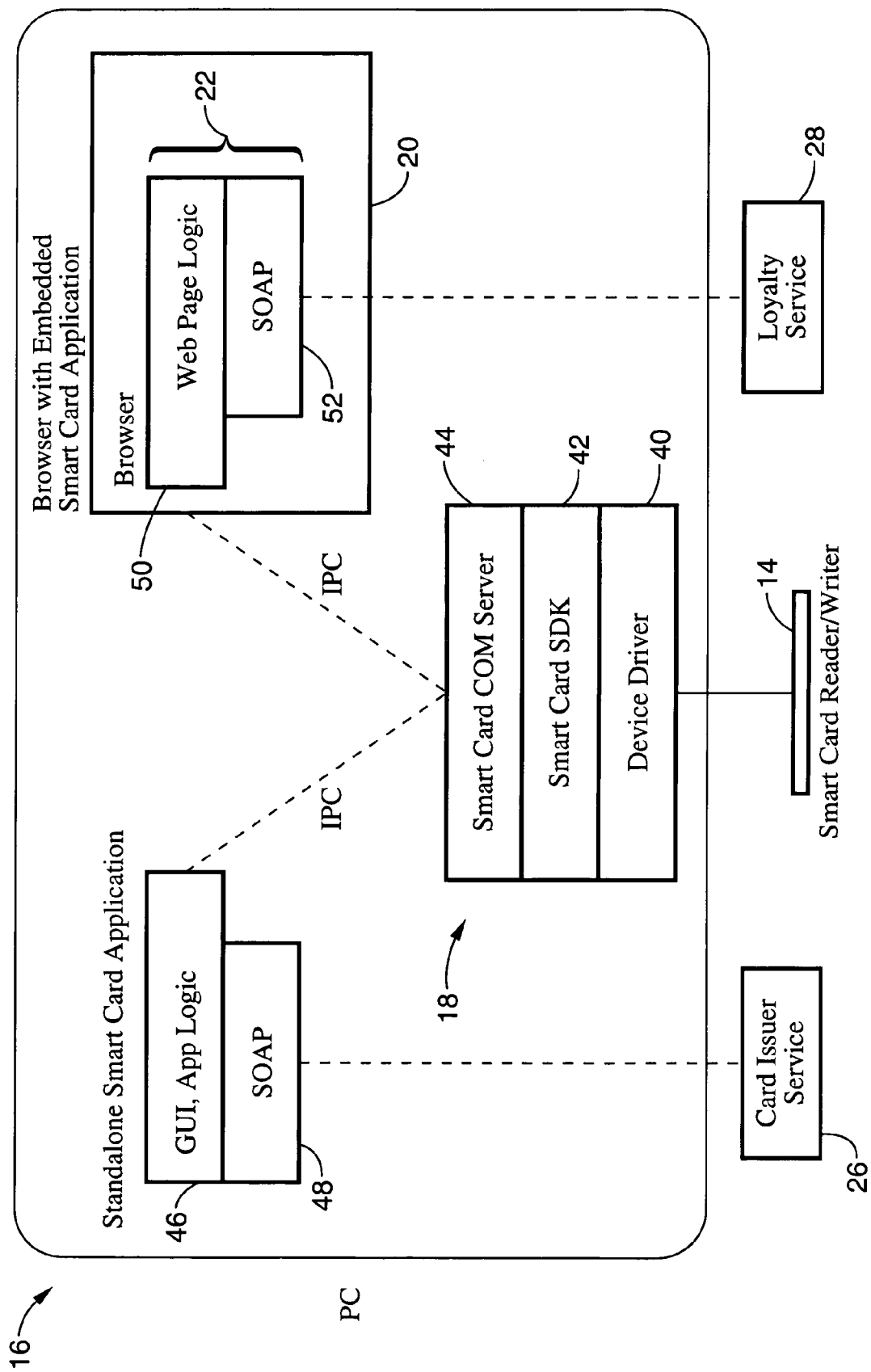
FIG. 2 is a block diagram of software system components according to an embodiment herein, showing program routines for processing aspects of the smart card transaction.

FIG. 1 and FIG. 2 show the overall structure of an embodiment of the system for using one-time credit card information when executing a purchase transaction. Illustrated in FIG. 1 is an example embodiment 10 of the one-time use credit card information system. An electronic data card 12 is shown for use with the system and it contains a means for establishing wired and/or wireless connectivity with external devices and internal memory for retaining information about the user, device and transaction security. A reader-writer device 14 is exemplified which may be adapted with electrical contacts for establishing a connection to cards having connection-based wired connectivity. Card reader-writer 14 may be integrated within a PC (e.g., with a slot for wired card connectivity), an external device (e.g., USB connection to a small housing), or be integrated into other devices (e.g., printer adapted for receiving data from data cards). Optionally, a wireless connection can be established, wherein communication access is established in response to proximity or manual activation of the communication on the device operating with electronic data card features.

A computer 16, such as the network enabled personal computer of the user, or a laptop or personal digital assistant subject to connectivity at home or when traveling, is configured with a card application 18 to allow communication with electronic data card 12 through card reader-writer 14.

Computer 16 could also comprise computers adapted for web browsing that are accessible to the user and referred to herein as "shared browsing devices". These shared browsing devices may be located at work, at a library, at a friend's house, at a web café, or at a kiosk supporting a shared browsing mode. According to one embodiment of the invention, additional security procedures and communications are activated within the system when computer 16 comprises a shared browsing device, because the device is not registered to the user and does not contain certain user information, such as acquired during a registration process.

An application means for accessing organizations over the network, such as Internet 24, is exemplified with a browser application 20 having smart card transaction programming 22 for operation within, or in combination with, browsing application 20 for accessing the world wide web. By way of example, the browser application can comprise a conventional Internet browser, such as Microsoft Explorer®, Mozzila FireFox®, Netscape Navigator®, and/or other programs configured for providing similar connectivity over a network.

The electronic data card may be issued by a card issuer service 26, which also has connectivity, preferably secure, with Internet 24. The card issuer oversees the issuance of one-time use credit card information over the Internet through PC 16 or kiosk 36 with smart card 12.

A loyalty service 28 oversees the incentive programs including issuance and redemption processes, preferably for both purchase and non-purchase incentives.

Partner websites 30 are illustrated which support aspects of transaction or incentive processing according to the present system. These organizations are typically merchants or other organizations which can be browsed by the user and support transaction execution and incentive issuance and/or redeeming. It is generally preferable that secure connectivity not be necessary for partner websites.

Third party websites 32 can be browsed by the user at PC 16 for providing additional transaction services. There is no restriction on operations of third party websites according to the invention.

Another application of the system is depicted with regard to a kiosk 36 which is configured with a kiosk application 38 that controls a reader-writer 14 for communicating with electronic data card 12. The kiosk-based incentive system provides for location-based transaction execution, and does not typically support web-browsing in this mode except for support of a shared browsing mode as described above.

Figure 3:
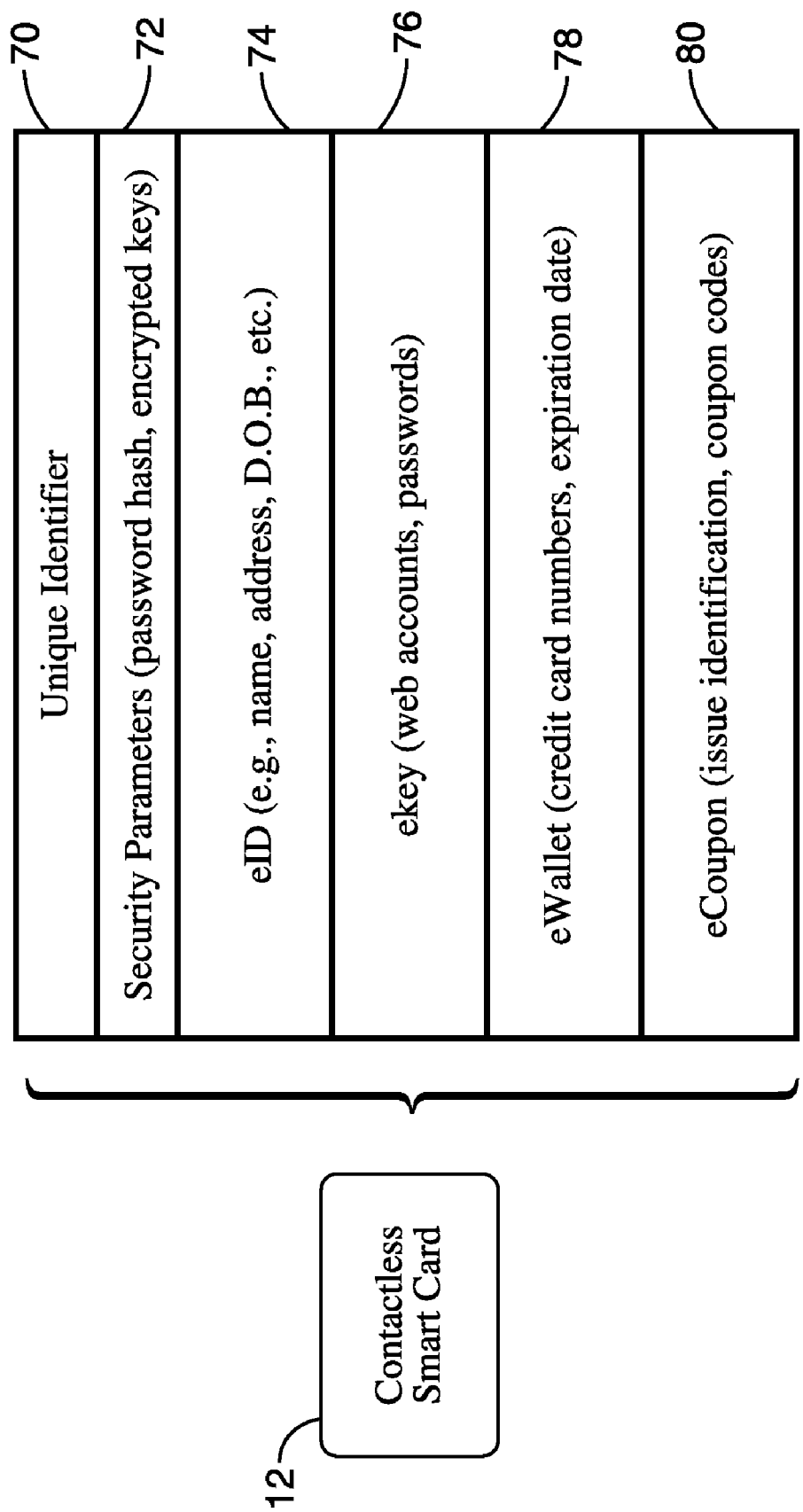
FIG. 3 is a partial data schema of records within a smart card implemented according to an embodiment herein.
Figure 4:
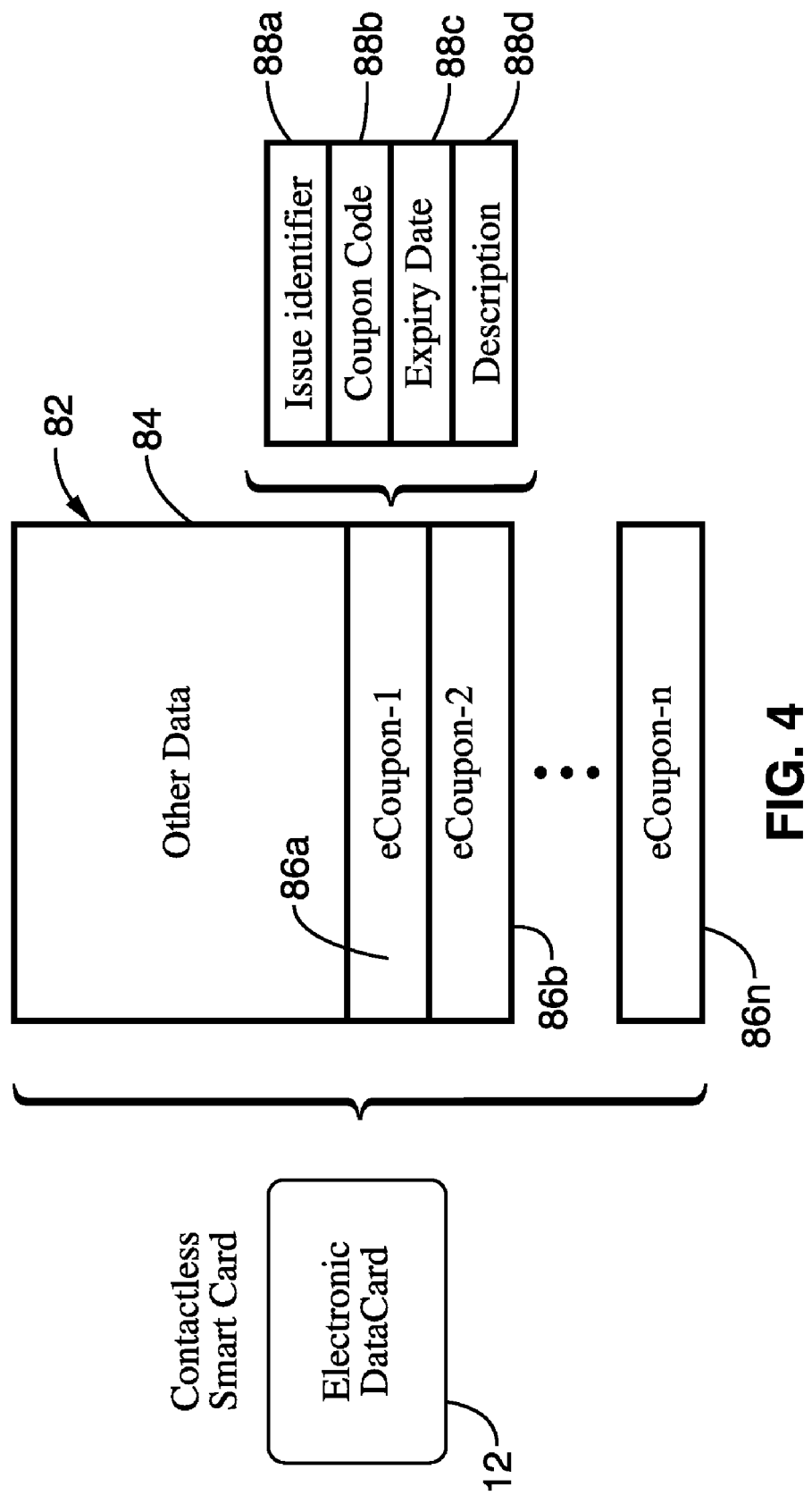
FIG. 4 is a partial data schema of records within a smart card implemented according to an embodiment of herein, showing electronic coupon related fields.

FIG. 2 illustrates applications running in PC 16 according to an embodiment of the invention. The embodiment of FIG. 2, as well as that of FIG. 3 and FIG. 4, are described as specific to an electronic data card comprising a smart card, to which the system is particularly well-suited, although it should be appreciated that other devices having memory and external connectivity may be similarly supported.

Card reader and/or writer 14 is interfaced to a card processing application 18 exemplified with execution layers comprising a device driver 40 for controlling the low level hardware, a logical device layer such as from a smart card SDK (Software Development Kit) 42, and a smart card common object module (COM) server 44 providing a command interface for access within the system.

Standalone card application 18 is shown comprising a graphical user interface (GUI) 46 along with programming to control a simple object access protocol (SOAP) 48. SOAP can be generally considered to be a protocol used for client-server communication that sends and receives information "on top of" HTTP. In one implementation the data sent and received is in a particular XML format specifically designed for use with SOAP. It should be appreciated that embodiments of the present invention need not incorporate SOAP but may utilize any desired network connectivity protocols or mechanisms without departing from the teachings herein.

A browsing application 20 is illustrated with reward agent programming 22 that in this embodiment comprises web page logic 50 and secure communications programming (e.g., SOAP) 52 with the Internet.

FIG. 3 illustrates, by way of example, data structures retained within a version of electronic data card 12. A unique identifier 70 allows the system to uniquely determine one data card from another. This data is used during registration of the card after issuance and identifies the card for each system access.

Optional fields 72 through 78 are shown comprising the following. Security parameters may be provided 72, such as a password hash, encrypted keys, and the like. Identification of the user can be retained 74, for example name, address, date of birth (D.O.B.), and so forth. It will be appreciated that access to this and other user information may be provided in a hierarchical form associated with security provisions to control information dissemination. Information for controlling access to partners and third parties can be provided in a set of ekeys 76, such as web accounts, passwords, and so forth. Transaction account information 78 may be retained, such as eWallet parameters including credit card access codes (e.g., numbers), expiration dates, security codes, and so forth.

Finally, a portion of the memory 80 within the device is configured for retaining electronic incentives which could be generally referred to as "eCoupons", which may comprise those issued for either purchase or non-purchase activity. It should be noted that the storage of account information (fields 72-78) is described for the case of eCoupon storage within a smart card or similar which also supports transaction functionality.

FIG. 4 illustrates by way of example a data region 82 having other data 84 as well as a number of eCoupons 86a, 86b through 86n. By way of example, the fields within an eCoupon are shown comprising an issue identifier 88a, coupon code 88b, expiration (expiry) date 88c, and coupon description 88d.

Figure 5:
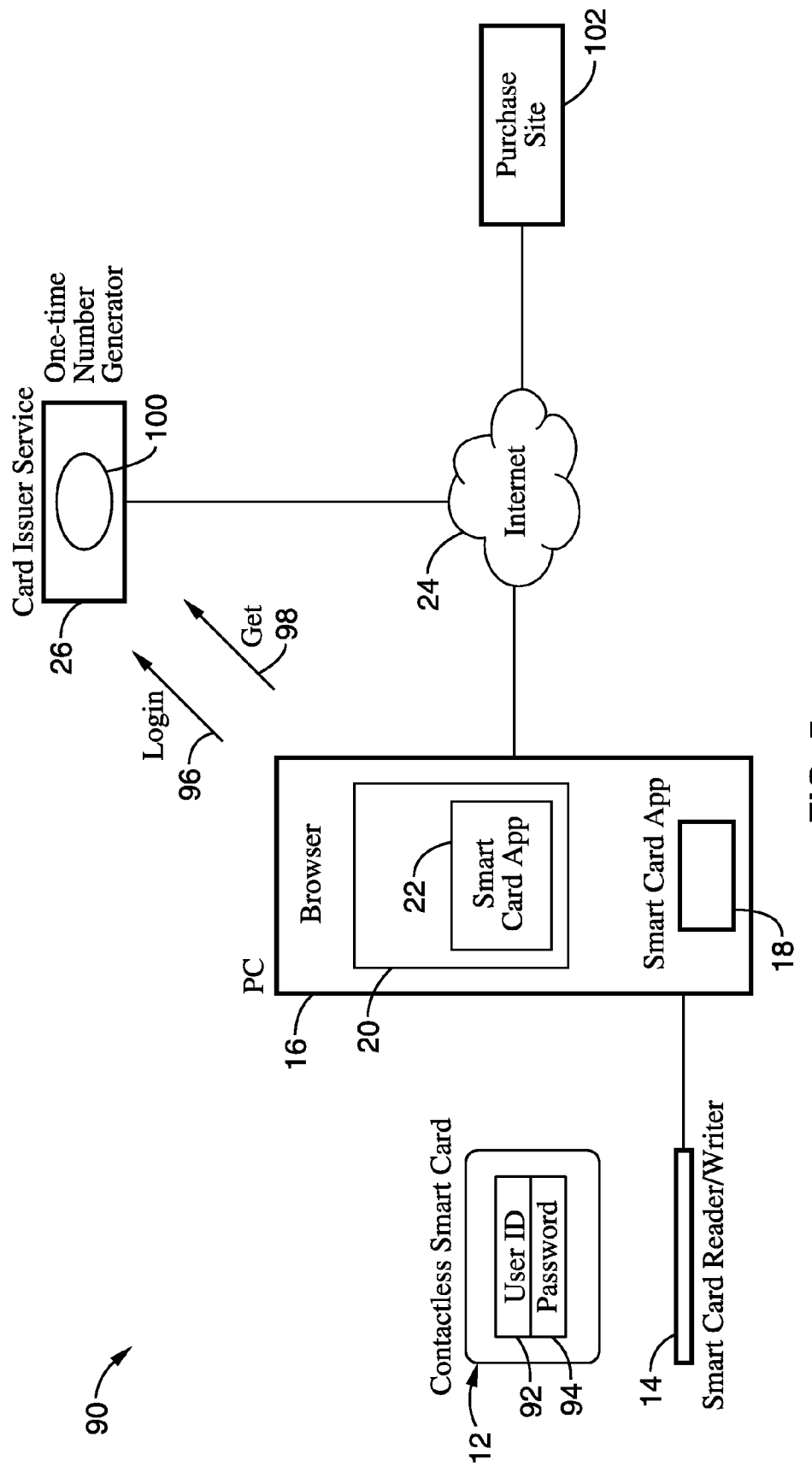
FIG. 5 is a block diagram of a transaction system shown in the process of obtaining "one-time" use credit card numbers according to an embodiment herein.

FIG. 5 illustrates by way of example the obtaining of "one-time" credit card information (e.g., credit card numbers) according to the present invention. By way of example, a contactless smart card 12 is depicted containing at least an identifier means (e.g., user ID) and a security means 94 (e.g., password) for performing login 96, getting one-time use credit card numbers 98, and so forth with card issuer 26 that is configured with a one-time use data generator 100.

The present system is configured to provide for both web and retail based transaction functionality in response to data stored on an electronic data card, referred to herein as a smart card. The smart card is configured to support transaction functionality as well as the storage of transaction account information and a number of optional elements, including for example incentive offers.

The user activates their electronic data card, such as by using a standalone or web-based application. This activation allows the card issuing service to initialize the card, and it also triggers registration of the user and card with the service and any other support such as for a loyalty service.

After, or during the smart card activation process, the user must register for receiving and utilization of "one-time use" credit card numbers. In a preferred mode, the user can set parameters controlling one-time card number use, such as under what conditions, in what environments, how to collect one-time numbers (e.g., real-time or prefetch), communication control, security control and the like. Registration may be performed using the smart card following a login with high security identification of the user. During the registration process code values can be stored in the smart card to identify aspects of one-time use to the card issuer service.

In a conventional smart card transaction the user couples their card (direct connection or proximity-based connection) to the reader 14 wherein they can execute a transaction over Internet 24 with purchase site 102. In a conventional credit card transaction the information about the user, such as billing name, address and phone number along with credit card number, expiration date, and often times the security code on the rear of a conventional card are entered to the web site to commence a transaction. A similar process can take place using a smart card, or other forms of exchange which provide an account identifier and securely identify the party attempting to access the account.

In contrast to conventional transaction processing, the present invention provides increased security with the use of one-time credit card numbers. When the user desires to execute a transaction with purchase site 102, they can utilize their smart card to login 96 to the card issuer site 26 and collect 98 a one-time credit card number for executing the purchase transaction.

According to one embodiment of the invention, the application code executing on the computer, such as the user's personal computer, acts as a transaction agent to intermediate the communication between smart card, issuer and purchase site.

In one embodiment the card issuer is adapted to identify the user associated with smart card 12 in a login process 96. The smart card can then request 98 one-time credit card information, wherein the one-time number generator determines that the user is qualified and generates a number (and/or other information required to execute a financial transaction) that is communicated back to the smart card.

The one-time use number is utilized in one embodiment by an agent, such as a browser extension. The browser extension is configured to extract (pull) information from the card and automatically fill (auto-fill) the appropriate fields in web pages being accessed. This extension can then perform the four steps listed above with minimal user involvement. In one preferred implementation the agent processing the one-time credit card number is preferably embedded in the functionality of a popular web browser such as Internet Explorer.

In one embodiment the one-time card use transaction execution information is utilized by the transaction processing system which automatically retrieves the one-time use information from the smart card. The one-time use information may be collected either (1) at the time of the transaction or more preferably (2) preloaded prior to transaction execution.

In the first case the smart card can communicate through the transaction application to the card issuer to retrieve one-time use card information. In the second case the smart card, such as via a user device connection (e.g., PC, laptop computer, PDA, cellular phone, Blackberry device, and so forth), preloads a set of one-time use card information for a subsequent purchase transaction. If the one-time use information is activated on the smart card, then this pre-loaded information is directed to the transaction application when executing a transaction.

In addition, the preloading of one-time card information may also be adapted with programming to manage a queue of one-time use information, thereby allowing a series of retail transactions, or on-line transactions, to be enacted without the need to collect additional one-time card information. Preferably one location in the queue, such as the top of the queue, appears to the transaction processing application as a conventional fixed field when it communicates with the smart card. In this way upon accessing the smart card the transaction programming, such as in the retail point of sale system, will automatically retrieve information from the top of the queue. Thereafter the programming in the smart card executes a reordering of the queue, or pointers thereto, so that the next set of one-time use information is prepared for a subsequent transaction.

It will be appreciated that by loading multiple sets of one-time card information the smart card can be preloaded by the user to handle any desired number of transactions at retail establishments. It should also be appreciated that this multiple card number arrangement maintains compatibility with retail transaction systems that have not been adapted according to the invention for retrieving one-time use information from the issuer at the time of the transaction, or having a knowledge of list structures or queue structures in the smart card upon which one-time card information can be retained.

According to one aspect of the invention, the one-time card information which has been used for a transaction is not immediately deleted, but is marked so that verification can be later performed between executed transactions and one-time use information if any issues arise. Furthermore, statistics of the transaction such as date, time, merchant, amount, item list, and so forth can be stored in, or associated with, the used one-time card information. Alternatively, the used one-time card information can be copied to another application, such as a transaction tracking application, wherein the one-time card information used for each transaction is added to the database of transaction information.

It will be appreciated that if the user desired to execute a number of retail transactions wherein they either cannot, or choose not to, access the card issuer, the system can be configured to allow the user to retrieve more than one set of one-time card information, wherein these can be stored in the smart card for use in a series of transactions. Alternatively, but not equivalently, a single set of temporary card information can be provided that is configured with a use count allowing each set of card information to be used for a specific number of transactions, or alternatively for a period of time, and so forth. It should be appreciated that issuers may allow groups of numbers to be generated and used at later times according to this aspect of the invention, wherein these numbers can be cached on the smart card.

FIG. 6 represents steps according to an embodiment for retrieving and using the one-time use credit card number and information according to execute purchase transactions.

User registration along with activation of the smart card are represented by block 110. In this process the user adds to their smart card the account information (e.g., user ID, password, and so forth) needed to use the smart card and furthermore in order to access and use the "one-time" card number service from the card issuer. The registration process could be considered to provide for registering the card for conventional use, while the activation process can be considered to activate the "one-time use" aspect from the card issuer and to establish the necessary parameters and configurations so that the desired method of utilizing "one-time" credit card numbers is enabled within the card and in response to the use of the card within the infrastructure for executing a purchase transaction. This information is stored in an encrypted form on the smart card and is "unlocked" by the smart card password. It should be appreciated that the process of registration and activation need only be performed once, although they may comprise separate steps, or be subject to periodic update requirements of a given issuer and other issuer-imposed constraints.

The user starts a web browser section and "opens" the card by providing a password as per block 112. During browsing the user navigates to a purchase site, enters at least one item (or service) into a shopping cart and commences with checkout, as represented by block 114. In this mode, the smart card application that is coupled to, or integrated within, the browser detects a web form with a field for a credit card number, and configures an auto-fill mode as per block 116. For example the field, or fields, on the web page can be displayed in a different manner to make them stand out, such as coloring them, or an "auto-fill" selection mechanism can be displayed, such as a button on the browser toolbar, or a combination of one or more indicators or selectors for the auto-fill mode provided.

If auto-fill is not selected as per block 118, then transaction execution can continue to allow the user to enter other information as per block 124 to complete the transaction. In the case that auto-fill is selected the system proceeds to block 120 wherein a "one-time" use number is retrieved for use. Typically, the number is retrieved from the card issuer (or associated party authorized by the card issuer), but it may be retrieved from the card as stored from a prefetch operation for the "one-time" use number. Prefetch of the one-time use number may occur earlier in the same browser session, or in response to a prior session preferably constrained by an expiration condition, such as an operating parameter set by the user and/or smart card issuer. The transaction fields are filled by the one-time card information as per block 122, and preferably are displayed on the form providing feedback to the user.

It should be appreciated that in one mode of the invention the auto-fill selection may comprise a default, wherein the field is automatically filled in whenever transaction fields are being filled. In a preferred aspect of this mode, the system is configured to allow the user to overwrite the information if they desire to tender a different payment form.

The user may continue to enter other forms of information as given by block 124 to complete the forms for the transaction, for example user name, billing address, shipping address, daytime phone number, cellular phone number, email address, shipping type selection, gift card information, and the like. Upon completing the form the user enters "submit", or similar, as depicted by block 126 and the web site processes the transaction in what can appear to the user as a conventional manner.

Accordingly, the present invention provides a mechanism for replacing the use of a fixed credit card number with a one-time use number, wherein the security of the user's account (e.g., charge account, deposit account, or similar) is enhanced. The system, apparatus and method may be implemented in a number of alternative embodiments with a range of modes, aspects and features. The elements described herein may be implemented separately, or in various combination without departing from the teachings of the present invention.

The systems, apparatus and methods described herein are generally applicable to on-line or off-line purchase transaction execution. In one embodiment, a transaction execution application program is configured with a wired or wireless transaction card reader, such as a smart card reader device. The application program may comprise part of a browser, such as for use on a personal computer or similar browsing device. Alternatively, the transaction execution application program may comprise one or more applications associated with off-line purchases, such as those which are performed at a retail location or at a retail kiosk or similar.

In one embodiment, an apparatus for executing transactions with an electronic transaction card using automatic temporary account information comprises (a) an electronic data card application executing on a computer and configured for accessing an electronic data card in response to establishing connectivity between the electronic data card and the computer; (b) means for enabling an electronic data card to receive temporary card numbers for use by the electronic data card application in executing purchase transactions; (c) means for retrieving a temporary card number for the electronic data card application from an issuing institution of the electronic data card; and (d) means for automatically communicating the retrieved temporary card number from the electronic data card application in response to submission of a purchase transaction through an electronic transaction infrastructure.

In one embodiment, the computer is adapted with a card reader configured for reading the electronic data card and is configured with Internet connectivity for executing purchase transactions on web sites at the direction of a user of the computer browsing any world wide web portion. This embodiment is particularly well suited for use with transactions executed from merchant web forms when browsing the world wide web.

In one embodiment, the computer is adapted with a card reader configured for reading the electronic data card, and is coupled to the transaction infrastructure for submitting transactions from a merchant for execution by the issuer. Here, sales can be made such as through point of sale systems at retail merchants.

A means for activating the electronic data card with the issuing institution can be incorporated to authorize the receipt of temporary card numbers generated by the issuing institution.

The means for retrieving a temporary card number can be configured for establishing communication with the issuing institution, requesting a temporary card number, and receiving temporary card information in response to selection of an auto-fill mode for the execution of a transaction.

The auto-fill mode of the system can be automatically executed in response to detecting that card number fields for the transaction are available into which the temporary card number can be inserted. The auto-fill mode may be executed in response to user selection of an auto-fill mode, a default setting, or in response to detected conditions matching user established parameters, and so forth.

The electronic data card is selected from the group of portable memory bearing devices configured for establishing interconnectivity with a reader device selected from the group of electronic devices consisting of smart cards, digital wallets, cellular phones, personal digital assistants, FLASH drives, and other electronic devices.

In another embodiment, an apparatus for executing transactions with an electronic transaction card using temporary account information, comprises: (a) a computer configured for communicating over an electronic network and adapted for reading and writing data from an electronic data card having memory configured for storing transaction account information; and (b) transaction execution programming operable on the computer for, (i) establishing communication with an issuer of the electronic data card, (ii) sending a command to retrieve temporary card data from the issuer, (iii) storing the temporary card data on the electronic transaction card, or the computer, or a combination of the computer and the electronic transaction card, (iv) detecting the presence of transaction field, or fields, adapted for receiving a card number, (v) automatically filling in the field with the temporary card information from the issuer in response to user selection of an auto-fill mode, or the execution of auto-fill mode as a default setting, or the execution of auto-fill mode in response to a non-web-based merchant transaction, (vi) submitting the temporary card information within a set of information sent for executing a purchase transaction. The temporary card number is configured to be valid for executing the purchase transaction for a limited number of transactions, a limited amount of time, or a combination of limited time and transaction execution.

In one mode, the transaction execution programming comprises programming integrated with or coupled to a web browser for executing transactions over the world wide web.

In another embodiment, a method of executing transactions with an electronic transaction card using automatic temporary account information, comprises: (a) reading an electronic transaction card having memory configured for storing transaction account information from a computer configured for submitting purchase transactions over an electronic network; (b) establishing communication between the computer configured for reading from the electronic data card communicating over an electronic network and an issuer of the electronic data card; (c) sending a command to retrieve temporary card data from the issuer; (d) storing the temporary card data on the electronic transaction card, or the computer, or a combination of the computer and the electronic transaction card; (e) detecting the presence of at least one transaction field adapted for receiving card data for executing the transaction; (f) automatically filling in the field with the temporary card information from the issuer in response to user selection of an auto-fill mode, or the execution of auto-fill mode as a default setting, or the execution of auto-fill mode in response to a non-web-based merchant transaction; and (g) submitting the temporary card information within a set of information sent for executing a purchase transaction. The temporary card number is configured to be valid for a single transaction or executing the purchase transaction for a limited number of transactions, over a limited amount of time, or a combination of limited time and transaction execution.

In one mode the method further comprises enabling the electronic data card to receive temporary card numbers from the issuer prior to execution of purchase transactions using the electronic data card.

Various aspects of the systems, apparatus and methods described herein include, but are not limited to, the following:

(a) secure credit card transactions using an electronic data card over a transaction infrastructure.

(b) an electronic data card application configured for automatically retrieving one-time credit card data for a transaction.

(c) an electronic data card application configured for automatically populating purchase transaction forms with one-time credit card data which has been retrieved.

(d) a mechanism for retrieving one-time credit card data and marking transaction execution fields for automatic population with the one-time use transaction data.

(e) a one-time use smart card system that can be utilized for executing secure transactions either on-line (e.g., when accessing the world wide web) or off-line (e.g., from the POS system of a retail establishment).

(f) a mechanism for using one-time use transaction information from an electronic data card which can comprise a contact (e.g., wired), or contactless (e.g., wireless, near-field) device.

(g) one-time transaction execution from an electronic data card that can comprise a smart card, digital wallet, cellular phone, personal digital assistant, or similar device configured to communicate data needed for executing a purchase transaction securely.

(h) incorporation of a loyalty feature into the one-time transaction execution system of the invention.

(i) a mechanism for enhancing transaction security which can be incorporated into personal computer devices as well as retail and kiosk driven transaction systems.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for".

What is claimed is:

1. An apparatus, comprising:
    an electronic data card configured for providing connectivity and the storage of account information including one or more rewritable temporary card numbers;
    said electronic data card configured for being accessed by an electronic data card application program executable on a computer;
    said electronic data card configured for receiving, through said electronic data card application program, at least one temporary card number from an issuing institution, or card issuer, of the electronic data card; and
    said electronic data card configured for automatically communicating said received temporary card number for submission of a purchase transaction through an electronic purchase transaction infrastructure.

2. An apparatus as recited in claim 1, wherein said electronic data card is a functional component of a system, said system comprising:
    said computer;
    said electronic data card application executable on said computer; and
    a card reader/writer connected to said computer and configured for reading and writing to said electronic data card;
    wherein said computer is configured with Internet connectivity for executing purchase transactions on web sites at the direction of a user of said computer browsing any world wide web portion.

3. An apparatus as recited in claim 1, wherein said electronic data card is a functional component of a system, said system comprising:
    said computer;
    said electronic data card application executable on said computer; and
    a card reader/writer connected to said computer and configured for reading and writing to said electronic data card;
    wherein said computer is configured to be coupled to the transaction infrastructure for submitting transactions from a merchant for execution by the card issuer.

4. An apparatus as recited in claim 1, wherein said electronic data card is configured for being activated by the issuing institution or card issuer to authorize receipt of a temporary card number generated by the issuing institution or card issuer.

5. An apparatus as recited in claim 1, wherein said electronic data card is configured for receiving temporary card information in response to selection of an auto-fill mode for the execution of a transaction.

6. An apparatus as recited in claim 5, wherein said auto-fill mode is automatically executed in response to detecting that card number fields for said transaction are available into which said temporary card number can be inserted.

7. An apparatus as recited in claim 5, wherein said auto-fill mode is executable in response to user selection of an auto-fill mode.

8. An apparatus as recited in claim 1, wherein said electronic data card is selected from the group of electronic devices consisting essentially of smart cards, digital wallets, cellular phones, personal digital assistants, and FLASH drives.

9. A system, comprising:
    an electronic data card configured for providing connectivity and the storage of account information including one or more rewritable temporary card numbers;
    a computer;
    an electronic data card application program executable on said computer; and
    a card reader/writer connected to said computer and configured for reading and writing to said electronic data card;
    said electronic data card configured for being accessed by said electronic data card application program;
    said electronic data card configured for receiving, through said electronic data card application program, at least one temporary card number from an issuing institution, or card issuer, of the electronic data card; and
    said electronic data card configured for automatically communicating said received temporary card number in response to submission of a purchase transaction through an electronic purchase transaction infrastructure.

10. A system as recited in claim 9, wherein said computer is configured with Internet connectivity for executing purchase transactions on web sites at the direction of a user of said computer browsing any world wide web portion.

11. A system as recited in claim 9, wherein said computer is configured to be coupled to the transaction infrastructure for submitting transactions from a merchant for execution by the card issuer.

12. A system as recited in claim 9, wherein said electronic data card is configured for being activated by the issuing institution or card issuer to authorize receipt of a temporary card number generated by the issuing institution or card issuer.

13. A system as recited in claim 9, wherein said electronic data card is configured for receiving temporary card information in response to selection of an auto-fill mode for the execution of a transaction.

14. A system as recited in claim 13, wherein said auto-fill mode is automatically executed in response to detecting that card number fields for said transaction are available into which said temporary card number can be inserted.

15. A system as recited in claim 13, wherein said auto-fill mode is executable in response to user selection of an auto-fill mode.

16. A system as recited in claim 9, wherein said electronic data card is selected from the group of electronic devices consisting essentially of smart cards, digital wallets, cellular phones, personal digital assistants, and FLASH drives.

17. A method, comprising:
providing an electronic data card configured for providing connectivity and the storage of account information including one or more rewritable temporary card numbers;
said electronic data card configured for being accessed by an electronic data card application program executable on a computer;
said electronic data card configured for receiving, through said electronic data card application program, at least one temporary card number from an issuing institution, or card issuer, of the electronic data card; and
said electronic data card configured for automatically communicating said received temporary card number in response to submission of a purchase transaction through an electronic purchase transaction infrastructure.

18. A method as recited in claim 17, further comprising:
providing said computer;
providing said electronic data card application executable on said computer; and
providing a card reader/writer connected to said computer and configured for reading and writing to said electronic data card.

19. A method as recited in claim 18, wherein said computer is configured with Internet connectivity for executing purchase transactions on web sites at the direction of a user of said computer browsing any world wide web portion.

20. A method as recited in claim 18, wherein said computer is configured to be coupled to the transaction infrastructure for submitting transactions from a merchant for execution by the card issuer.

21. A method as recited in claim 17, wherein said electronic data card is configured for being activated by the issuing institution or card issuer to authorize receipt of a temporary card number generated by the issuing institution or card issuer.

22. A method as recited in claim 17, wherein said electronic data card is configured for receiving temporary card information in response to selection of an auto-fill mode for the execution of a transaction.

23. A method as recited in claim 22, wherein said auto-fill mode is automatically executed in response to detecting that card number fields for said transaction are available into which said temporary card number can be inserted.

24. A method as recited in claim 22, wherein said auto-fill mode is executable in response to user selection of an auto-fill mode.

25. A method as recited in claim 17, wherein said electronic data card is selected from the group of electronic devices consisting essentially of smart cards, digital wallets, cellular phones, personal digital assistants, and FLASH drives.

26. A system for executing transactions with an electronic transaction card using temporary card information, comprising:
a computer;
said computer configured for communicating over an electronic network;
said computer configured for reading and writing data from an electronic data card having memory configured for storing transaction account information; and
transaction execution programming executable on said computer for carrying out the operations of:
(i) establishing communication with an issuer of said electronic data card;
(ii) requesting receipt of temporary card information in response to the sending of a command to the card issuer;
(iii) retrieving temporary card information from said issuer in response to said command;
(iv) storing said temporary card information received from said issuing institution on said electronic transaction card, or said computer, or a combination of said computer and said electronic transaction card;
(v) detecting the presence of transaction field, or fields, adapted for receiving a card number;
(vi) automatically filling in said field with said temporary card information from said issuer in response to user selection of an auto-fill mode, or the execution of auto-fill mode as a default setting, or the execution of auto-fill mode in response to a non-web-based merchant transaction; and
(vii) submitting said temporary card information within a set of information sent for executing a purchase transaction;
wherein said temporary card information is configured to be valid for executing said purchase transaction for a limited number of transactions, over a limited amount of time, or a combination of limited time and transaction execution.

27. A method of executing transactions with an electronic transaction card using automatic temporary card information, comprising:
reading an electronic transaction card, said electronic transaction card having memory configured for storing transaction card information from a computer, said computer configured for submitting purchase transactions over an electronic network;
establishing communication over an electronic network between said computer and an issuer of the electronic data card, said computer further configured for reading from said electronic transaction card;
sending a command to retrieve temporary card information from the issuer;

storing said temporary card information on said electronic transaction card, or said computer, or a combination of said computer and said electronic transaction card;

detecting the presence of at least one transaction field adapted for receiving card information for executing the transaction;

automatically filling in said transaction field with said temporary card information from the issuer in response to user selection of an auto-fill mode, or the execution of auto-fill mode as a default setting, or the execution of auto-fill mode in response to a non-web-based merchant transaction; and submitting said temporary card information within a set of information sent for executing a purchase transaction;

wherein said temporary card number is configured to be valid for executing said purchase transaction for a limited number of transactions, over a limited amount of time, or a combination of limited time and transaction execution.

28. An apparatus for executing a transaction with an electronic transaction card using automatic temporary account information, comprising:

an electronic data card application executable on a computer and configured for accessing an electronic data card in response to establishing connectivity between said electronic data card and said computer;

means for enabling the electronic data card to receive a temporary card number for use by the electronic data card application in executing a purchase transaction;

means for retrieving at least one temporary card number for the electronic data card application from an issuing institution, or card issuer, of the electronic data card; and means for automatically communicating said retrieved temporary card number from the electronic data card application in response to submission of a purchase transaction through an electronic transaction infrastructure.

* * * * *